United States Patent
MacDuff et al.

[15] 3,677,530
[45] July 18, 1972

[54] OVEN FOR HEATING CONTINUOUS TUBING

[72] Inventors: Richard MacDuff, Newark; Paul M. Stewart, Pembrey, both of Del.

[73] Assignee: Hercules Incorporated, Wilmington, Del.

[22] Filed: Feb. 10, 1971

[21] Appl. No.: 114,164

[52] U.S. Cl. .................................................. 263/3
[51] Int. Cl. .................................................. F27b 9/28
[58] Field of Search .......................... 263/3; 266/3

[56] References Cited

UNITED STATES PATENTS 3,355,156  11/1967  Hanna .......................... 263/3
3,361,417  1/1968  Borsvold ....................... 263/3

*Primary Examiner*—John J. Gamby
*Attorney*—Sheldon F. Raizes

[57] ABSTRACT

A multiple pass oven for heating continuous tubing of a thermoplastic polymer prior to orienting the same comprises an inlet chamber, an exit chamber and at least three conduits interconnecting the chambers. Rotatable wheels are provided in each chamber and spaced guide members are located in the conduits and on the peripheral edge of the wheels for receiving the tube therein. The guides are so designed that practically speaking the entire tube is at all times exposed to turbulent hot air circulating from the exit chamber through all of the conduits to the inlet chamber.

17 Claims, 5 Drawing Figures

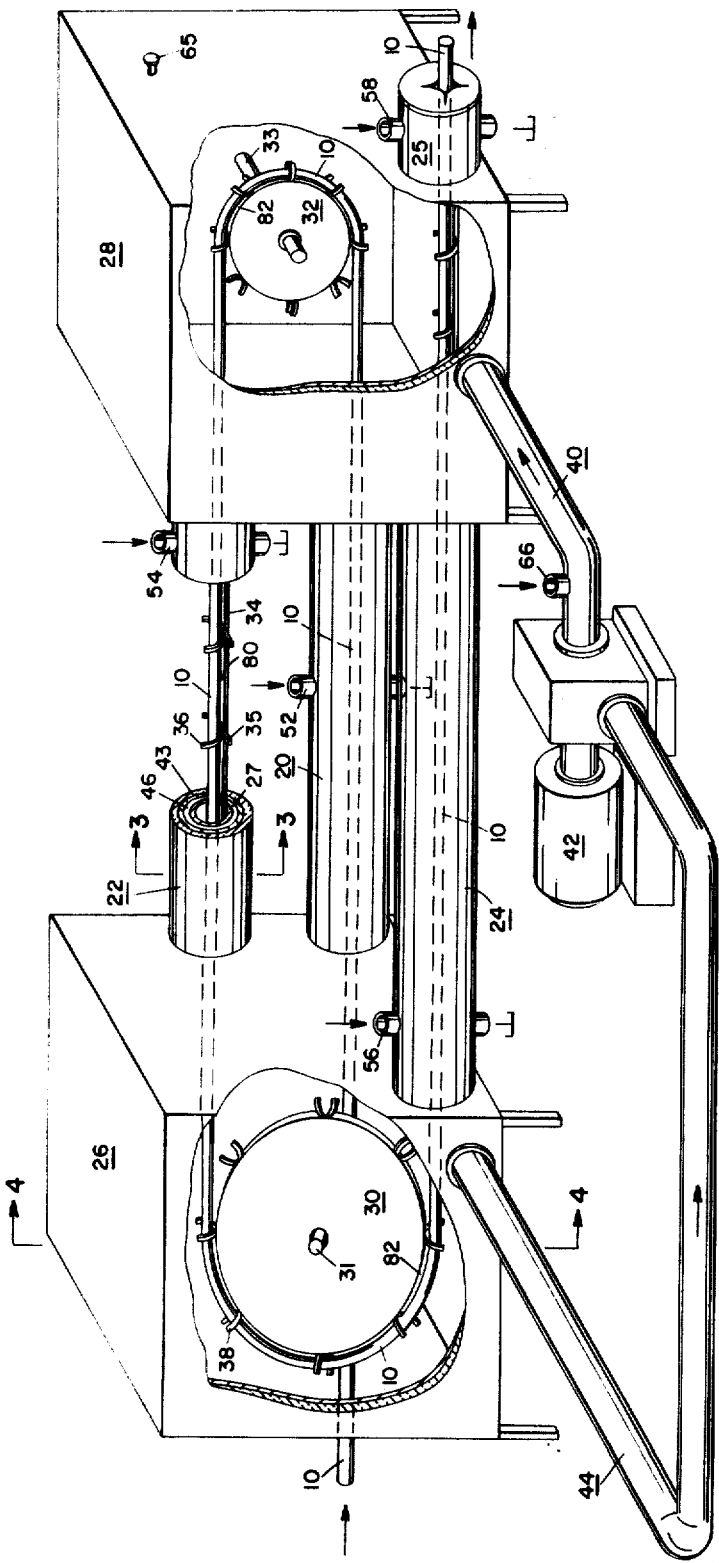
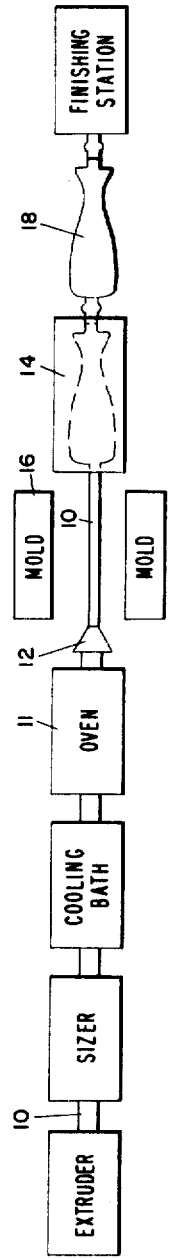

RICHARD MacDUFF
PAUL M. STEWART
INVENTORS

BY Sheldon F. Raizes

ATTORNEY

OVEN FOR HEATING CONTINUOUS TUBING

It is an object of this invention to provide a multiple pass oven for efficiently heating a continuous tubing of a thermoplastic polymer prior to blow molding the same into containers. While the invention may be utilized for any thermoplastic material, it is particularly adaptable to solid polymers of mono-α-olefins containing up to six carbon atoms which have high degrees of crystallinity, for example high density ethylene polymers and isotactic polypropylene, poly-4-methyl pentene-1, polybutene and the like. FIG. 1 is a process flow diagram;

FIG. 2 is a perspective view of an oven including partial break-away views thereof;

Figure 3:
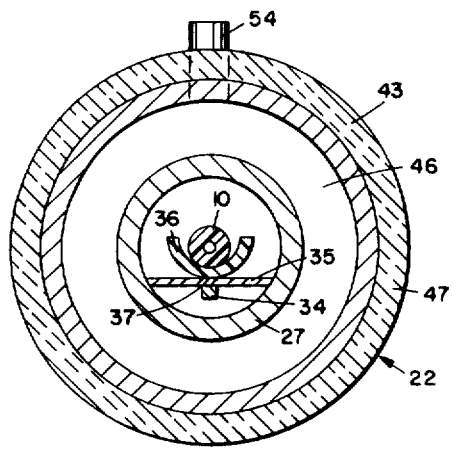
FIG. 3 is a view in section taken along section line 3-3 of FIG. 2.

Referring to the flow diagram of FIG. 1, an extruder is utilized to extrude a polypropylene tube 10. The tube passes through a sizer and then a cooling bath where the tube is cooled below the crystalline temperature. In the case of polypropylene, the tube is cooled to about 120° C. to hasten crystallization. The tube 10 is drawn from the extruder through the sizer and cooling bath by a driven set of opposed tires (not shown). The tube 10 is reheated in an oven 11 to a few degrees below the crystalline melting point (about 140° C. to 167° C.) and after being reheated, passes through a restriction cone 12 to a pair of molds 14 and 16 which alternately grip the tube 10 and moves away from the oven to stretch the same through the cone 12 to orient the tube. Mold 14 grips the tube 10 and moves away from the oven to stretch and orient the tube 10. While the tube is being stretched by mold 14, the mold 16 is opened and moves toward the oven and stops adjacent the stretched tube and closes on the tube to grip the same and moves away from the oven to stretch a new portion of the tube 10 emerging from the oven. After mold 16 closes and is moving away from the oven, mold 14 stops and opens to discharge a bottle 18 and then moves toward the oven to repeat the cycle. Each of the molds is communicated with a source of pressure which is utilized to expand the tube inside the mold to form the bottle 18. The bottle 18 proceeds to a finishing station where it is separated from the other bottles, flash removed, and the neck of the bottle trimmed and bored to final size.

The invention is directed to the technique for reheating the tubing in oven 11 which will be described in detail. The remaining functions described above are well known.

Figure 4:
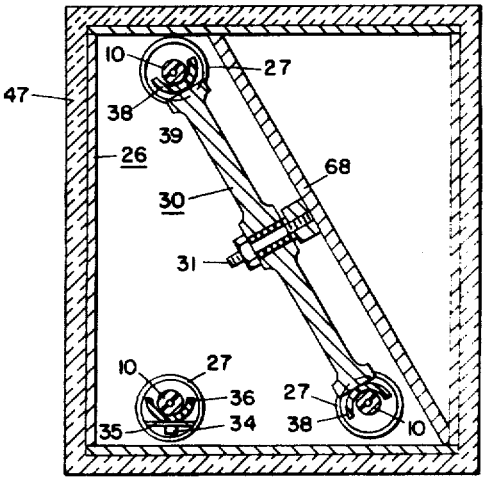
FIG. 4 is a view in section taken along section line 4-4 of FIG. 2.
Figure 5:
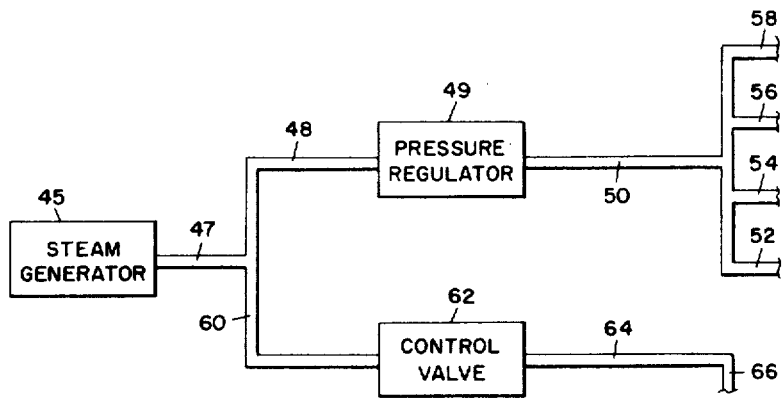
FIG. 5 is a steam flow diagram.

Referring to FIG. 2, three conduits generally designated by reference numerals 20, 22, and 24 interconnect and open into an inlet chamber 26 and an exit chamber 28. Conduit 25 leads from the exit chamber 28. Each of the conduits include an inner pipe 27 through which the tubing 10 passes. A guide wheel 30 is rotatably mounted on an axle 31 in the inlet chamber 26 and a guide wheel 32 is rotatably mounted on an axle 33 in exit chamber 28. A support strip 34 extends the length of the pipe and has a plurality of spaced transverse plates 35 secured thereto by any well known means and which lie across a chordal portion of the pipe to hold the strip in position in the pipe. The width of the strip 34 is about ⅓ of the diameter of the tubing 10. A plurality of generally U-shaped Teflon members 36 are fixedly secured at the closed end 37 to the transverse plate 35 at various spaced locations along the length of the strip 34. The U-shaped members 36 are so located in the pipe 27 that the axis of the tubing 10 passing therethrough will be coincident with the axis of the pipe 27. Each wheel has a plurality of generally U-shaped members 38 secured at the closed end 39 to the periphery thereof at various spaced locations. Referring to FIG. 4, an axle support plate 68 is fixed to the walls of the inlet chamber from which axle 31 extends. As can be seen from FIG. 4, the wheel is tilted at such an angle that the guide members 38 will be aligned with and lie in substantially the same plane as a plane passing through the guide members 36 in conduits 22 and 24. An inlet opening for the tube 10 is provided in the front wall of the inlet chamber 26 and is aligned with the conduit 20. Referring back to FIG. 1, the wheel 32 lies in a vertical plane so that the guide members thereon will be aligned with and lie in substantially the same plane as the vertical plane passing through the guide members 36 in conduits 20 and 22.

The guide members may be constructed of any given material but should be of a material presenting a minimum of frictional resistance to movement of the tube 10 to prevent any premature stretching of the tube 10. The guide members should also be a low conductor of heat in order not to take heat away from the tube 10 as it passes thereover and of course, the guide members should have a melting point above that of the tube. For instance, a polytetrafluoroethylene guide member is very suitable for a polypropylene tube. Other materials such as polychlorotrifluoroethylene, polyvinylidene fluoride, and fluorinated ethylene-propylene copolymer plastics are suitable for use with polypropylene.

An air heating duct 40 is communicated at one end with a blower 42 and at the other end with the exit chamber 28. The location of the air heating duct opening into the exit chamber 28 is such that it is adjacent the path of the tube passing from the conduit 24 into the exit pipe 25. This assures that the tube is exposed to maximum air temperature just prior to being stretched, allowing the tube to pick-up additional heat at this point if the tube is below the desired temperature. An air return duct 44 is communicated at one end with the blower 42 and at the other end with the inlet chamber 26. Each of the conduits 20, 22, 24, and 25 and the air heating duct 40 include a steam jacket 46 surrounding a respective pipe 27. Each of the chambers, conduits, and the heating and return ducts is covered with insulating material 43 to prevent substantial loss of heat. The blower 42 circulates air into the exit chamber 28, then through each of the conduits in the direction of the inlet chamber 26 and into the return duct 44 back to the blower 42. The air is circulated through the oven at a velocity to cause a turbulent flow of air therethrough.

A steam generator 45 provides steam for the ducts and conduits. A pressure line 47 leads from the steam generator 45 to pressure line 48 and a pressure regulator 49 is interposed between line 48 and a take-off line 50 which is communicated to ports 52, 54, 56, and 58 of conduits 20, 22, 24, and 25, respectively. The pressure regulator is set to provide constant steam pressure to the conduits to keep the surface of the conduit at a constant temperature. A pressure line 60 leads from the line 47 to a control valve 62 which is interposed between line 60 and a take-off line 64 which is communicated to port 66 of air supply duct 40. The control valve 62 responds to a signal imparted thereto by a thermocouple 65 located in the exit chamber 28. When the temperature in the exit chamber falls below a desired level, the thermocouple will impart a signal to the control valve to allow more steam to be supplied to the heating duct 40. The pressure regulator 49, control valve 62, thermocouple 65, and the automatic system (not shown) for imparting signals to the control valve 62 can be any well known device and system.

In operation, the crystallized tube enters the inlet chamber 26 and slides over the guide members in conduit 20, wraps around the guide members 38 on the wheel 32 causing the wheel to rotate and then passes back through the conduit 22 sliding over the guide members 36 therein, then passes around the guide members 38 on the wheel 30 causing the wheel 30 to rotate and then passes through the conduit 24 sliding over the guide members therein, through the chamber 28 and finally through the exit conduit 25. The force of pulling the tube through the oven is solely provided by the moving molds 14 and 16. The closed end 37 of the U-shaped members and the plates 35 keep the tube 10 spaced from the support strip 34 thus providing an air space 80 between the support strip 34 and the tube. The contact between the tube 10 and each U-shaped member is minimal with the legs of the U-shaped member serving as a guide if the tube should wander toward the walls of the conduit. The closed end 39 of the U-shaped members 38 keeps the tube from contacting the peripheral edge of the wheels 30, 32 thus providing an air space 82 between the wheel edge and the tube. For all practical purposes, the entire outer surface tube is in contact with the circulating air at all times.

Obviously, if more passes were required to properly reheat the tube, additional conduits and an appropriate number of wheels in the inlet and exit chamber may be provided for this purpose. In some cases, it may be desired to rotate one or both wheels 30, 32 with a motor to overcome friction so there will not be too much tension on the tubing when it passes over the wheels which may cause premature stretching.

If only two passes are needed instead of a minimum of three as shown in FIG. 2, then the tube 10 will enter the oven through chamber 28 as well as exit from chamber 28. Wheel 32 will not be used in such a case. If an even umber of passes are required, then the tubing 10 will enter and leave the oven at chamber 28. If an odd number of passes are required, then the tubing 10 will enter and leave the oven at chambers 26 and 28, respectively.

Instead of using a steam jacket around air heating duct 40, any suitable heat exchanger may be located in the return flow line (44,40) between the two chambers, preferably between the blower 42 and exit chamber 28.

What we claim and desire to protect by Letters Patent is:

1. An oven comprising: first and second chambers, at least two conduits located between and opening into said chambers, means for delivering air at a desired temperature to said first chamber and circulating said air through each of said conduits in a direction from said first chamber to said second chamber and out of said second chamber back to said first chamber, a plurality of stationary spaced guide members in each of said conduits, at least one wheel rotatably mounted in said second chamber, a plurality of spaced guide members fixedly secured to the outer periphery of said wheel, said wheel being so located that the guide members thereon are in substantially the same plane as a plane passing through the guide members in said conduits.

2. The structure as recited in claim 1, wherein said guide members are polytetrafluoroethylene.

3. The structure as recited in claim 1 further comprising: a steam chamber surrounding each of said conduits, and means for communicating steam under pressure to said steam chambers.

4. The structure as recited in claim 1, wherein said means for delivering air to said exit chamber includes heating means, said heating means including a steam chamber, and means for communicating steam under pressure to said steam chamber.

5. The structure as recited in claim 1 further comprising: a steam chamber surrounding each of said conduits, means for communicating steam at a constant pressure to said conduit steam chambers, said means for delivering air to first exit chamber including heating means comprising a steam chamber, and means for communicating steam to said last named steam chamber at a varying pressure in response to the temperature of the air in said first chamber.

6. The structure as recited in claim 3, wherein said means for delivering air to said first chamber includes heating means, said heating means including a steam chamber, and means for communicating steam under pressure to said last named steam chamber.

7. An oven comprising: first and second chambers, at least first, second, and third conduits located between and opening into said chambers, means for delivering air at a desired temperature to said first chamber and circulating said air through each of said conduits in a direction from said first chamber to said second chamber and out of said second chamber back to said first chamber, a plurality of stationary spaced guide members in each of said conduits, at least one wheel rotatably mounted in said first chamber and at least one wheel rotatably mounted in said second chamber, a plurality of spaced guide members fixedly secured to the outer periphery of each of said wheels, said wheel in said second chamber being so located that the guide members thereon are in substantially the same plane as a plane passing through the guide members in said second and third conduits, said wheel in said first chamber being so located that the guide members thereon are in substantially the same plane as a plane passing through the guide members in said first and second conduits.

8. The structure as recited in claim 7, wherein the planes of each wheel are at an angle to each other.

9. The structure as recited in claim 8, wherein said guide members are polytetrafluoroethylene.

10. The structure as recited in claim 9, wherein said guide members are generally U-shaped.

11. The structure as recited in claim 7 further comprising: a steam chamber surrounding each of said conduits, means for communicating steam at a constant pressure to said conduit steam chambers, said means for delivering air to said first chamber including heating means comprising a steam chamber, and means for communicating steam to said last named steam chamber at a varying pressure in response to the temperature of the air in said first chamber.

12. A process for heating a continuous thermoplastic tubing comprising: providing a multiple pass oven comprising a first chamber, a second chamber, a plurality of conduits in communication with and connecting said chambers; supplying heat to said conduits; supplying heated air to said first chamber; circulating said heated air from said first chamber through said conduits to said second chamber; exposing the entire outer surface of the tubing to the heated air by passing the tubing into one of said chambers and then through at least a first and second one of said plurality of conduits prior to discharging the same from said first chamber out of the oven; said tubing being passed through the first conduit by sliding the same over a plurality of fixed axially spaced guide members while turbulent hot air is being circulated through the first conduit; the tubing emerging from the first conduit into the other of said chambers and being wrapped around a plurality of circumferentially spaced guide members secured to a rotatable chamber wheel located in said other chamber and then passing through the second conduit in a direction toward said one chamber by sliding the same over a plurality of fixed axially spaced guide members while turbulent hot air is being circulated through the second conduit.

13. A process s defined in claim 12, wherein said tubing is of a crystalline mono-α-olefin polymer and the heated air supplied to the exit chamber is slightly below the crystalline melting point of said tubing.

14. A process as defined in claim 13, wherein said mono-α-olefin polymer is polypropylene.

15. A process for heating the entire outer surface of a continuous thermoplastic tubing comprising: providing a multiple pass oven comprising a first chamber, a second chamber, a plurality of conduits in communication with and connecting said chambers and at least one rotatable wheel in each of said chambers; supplying heat to said conduits; supplying heated air to said first chamber; circulating said heated air from said first chamber through said conduits to said second chamber; exposing the entire outer surface of the tubing to the heated air by passing the tubing into one of said chambers and then through at least a first and second one of said plurality of conduits prior to passing the same through a last conduit from the second chamber to the first chamber and out of the oven; said tubing being passed through the first conduit in a direction toward the exit chamber by sliding the same over a plurality of fixed axially spaced guide members while turbulent hot air is being circulated through the first conduit; the tubing emerging from the first conduit and being wrapped around a plurality of circumferentially spaced guide members secured to said wheel in the other of said chambers and then passing through the second conduit in a direction toward said one chamber by sliding the same over a plurality of fixed axially spaced guide members while turbulent hot air is being circulated through the second conduit; the tubing emerging from the second conduit and being wrapped around a plurality of circumferentially spaced guide members secured to said wheel in said one chamber; said tubing passing through the final conduit from said second chamber in a direction toward said first chamber by sliding the same over a plurality of fixed axially spaced guide members while turbulent hot air is being circulated through the final conduit in the opposite direction; the tubing emerging from the final conduit into said first chamber and then passing through the tubing through said first chamber and discharging the tubing from the oven.

16. A process as defined in claim 15, wherein said tubing is of a crystalline mono-α-olefin polymer and the heated air supplied to the exit chamber is slightly below the crystalline melting point of said tubing.

17. A process as defined in claim 16, wherein said mono-α-olefin polymer is polypropylene.

* * * * *